(12) United States Patent
Yuba

(10) Patent No.: US 8,508,477 B2
(45) Date of Patent: Aug. 13, 2013

(54) INPUT APPARATUS

(75) Inventor: Takashi Yuba, Shiagawa (JP)

(73) Assignee: Fujitsu Component Limited, Tokyo (JP)

( * ) Notice: Subject to any disclaimer, the term of this patent is extended or adjusted under 35 U.S.C. 154(b) by 1092 days.

(21) Appl. No.: 12/457,641

(22) Filed: Jun. 17, 2009

(65) Prior Publication Data

US 2009/0315866 A1    Dec. 24, 2009

(30) Foreign Application Priority Data

Jun. 19, 2008 (JP) ................................. 2008-160373

(51) Int. Cl.
*G09G 5/00* (2006.01)
*G06F 3/033* (2013.01)

(52) U.S. Cl.
USPC .............................. 345/161; 345/157; 463/38

(58) Field of Classification Search
USPC ........................................ 345/157; 463/38
See application file for complete search history.

(56) References Cited

U.S. PATENT DOCUMENTS

| | | | | |
|---|---|---|---|---|
| 4,091,234 | A | * | 5/1978 | Bristow ........................ 345/161 |
| 5,541,622 | A | * | 7/1996 | Engle et al. .................... 345/161 |
| 6,366,274 | B1 | * | 4/2002 | Elledge ......................... 345/163 |
| 6,400,353 | B1 | * | 6/2002 | Ikehara et al. ................. 345/157 |
| 6,400,354 | B1 | * | 6/2002 | Pin-Chien .................... 345/161 |
| 6,515,652 | B2 | * | 2/2003 | Liu ............................... 345/161 |
| 6,570,556 | B1 | * | 5/2003 | Liao et al. .................... 345/161 |
| 2002/0190945 | A1 | | 12/2002 | Arita et al. |
| 2004/0130530 | A1 | * | 7/2004 | Gustafsson ................... 345/161 |
| 2005/0190152 | A1 | * | 9/2005 | Vaganov ....................... 345/157 |
| 2006/0263189 | A1 | * | 11/2006 | Vigholm ....................... 414/685 |
| 2006/0283279 | A1 | * | 12/2006 | Levin et al. .............. 74/471 XY |

FOREIGN PATENT DOCUMENTS

| | | |
|---|---|---|
| JP | 08-185257 | 7/1996 |
| JP | 08-286824 | 11/1996 |
| JP | 11-353109 | 12/1999 |

OTHER PUBLICATIONS

Japanese Office Action dated Jan. 31, 2012 in Appln. No. 2008-160373.

* cited by examiner

*Primary Examiner* — Seokyun Moon
(74) *Attorney, Agent, or Firm* — Staas & Halsey LLP

(57) ABSTRACT

An input apparatus that moves an instruction sign displayed on a display device to any position, the display device being connected to an information processing apparatus, including: an operation portion that includes a magnet, and operates the movement of the instruction sign; a restoration portion that is composed of an elastic member, supports the operation portion, and restores the operation portion to a reference position when the operation portion has inclined; magnetic members that are arranged at maximum displacement positions of the operation portion where an attractive force of the magnet exceeds the restoring force of the restoration portion; a detection portion that detects an inclined direction and an inclined angle of the operation portion; and an output portion that outputs the inclined direction and the inclined angle detected by the detection portion to the information processing apparatus.

10 Claims, 10 Drawing Sheets

Y-DIRECTION

X-DIRECTION

INPUT APPARATUS

BACKGROUND OF THE INVENTION

1. Field of the Invention

The present invention relates to an input apparatus that moves a cursor or a pointer displayed on a display device to any position.

2. Description of the Related Art

Conventionally, there has been known a coordinate inputting device having an origin return means (See Japanese Patent Publication No. 08-185257). In the coordinate inputting device, a first permanent magnet 3 is fixed to a resin-molded button 1, and a second permanent magnet 6 is fixed to a printed wired board 7. Two or more spheres 4 intervene between the first permanent magnet 3 and the second permanent magnet 6.

Conventionally, there has been known an input apparatus (i.e., a pointing device) that returns an operating element to a former position by using a coil spring (See Japanese Patent Publication No. 11-353109).

However, in the conventional techniques, it is possible to return the operating element to an origin, but the operating element cannot be fixed at a maximum displacement position.

Therefore, when a user moves a pointer or a cursor to any position, the user must continue the operation of the operating element until the pointer or the cursor moves to a desired position.

SUMMARY OF THE INVENTION

It is an object of the present invention to provide an input apparatus that can fix an operation portion at a maximum displacement position, and return the operation portion to a reference position.

According to an aspect of the present invention, there is provided an input apparatus that moves an instruction sign displayed on a display device to any position, the display device being connected to an information processing apparatus, including: an operation portion that includes a magnet, and operates the movement of the instruction sign; a restoration portion that is composed of an elastic member, supports the operation portion, and restores the operation portion to a reference position when the operation portion has inclined; magnetic members that are arranged at maximum displacement positions of the operation portion where an attractive force of the magnet exceeds the restoring force of the restoration portion; a detection portion that detects an inclined direction and an inclined angle of the operation portion; and an output portion that outputs the inclined direction and the inclined angle detected by the detection portion to the information processing apparatus.

With the above arrangement, the attractive force of the magnet exceeds the restoring force of the restoration portion at one of the maximum displacement positions of the operation portion, and hence the operation portion is fixed to the corresponding maximum displacement position. At a position where the attractive force of the magnet does not exceed the restoring force of the restoration portion, the operation portion is restored to the reference position by the restoration portion. Therefore, it is possible to fix the operation portion at one of the maximum displacement positions, and return the operation portion to the reference position.

BRIEF DESCRIPTION OF THE DRAWINGS

Preferred embodiments of the present invention will be described in detail with reference to the following drawings, wherein.

DESCRIPTION OF THE PREFERRED EMBODIMENTS

A description will now be given, with reference to the accompanying drawings, of embodiments of the present invention.

Figure 1:
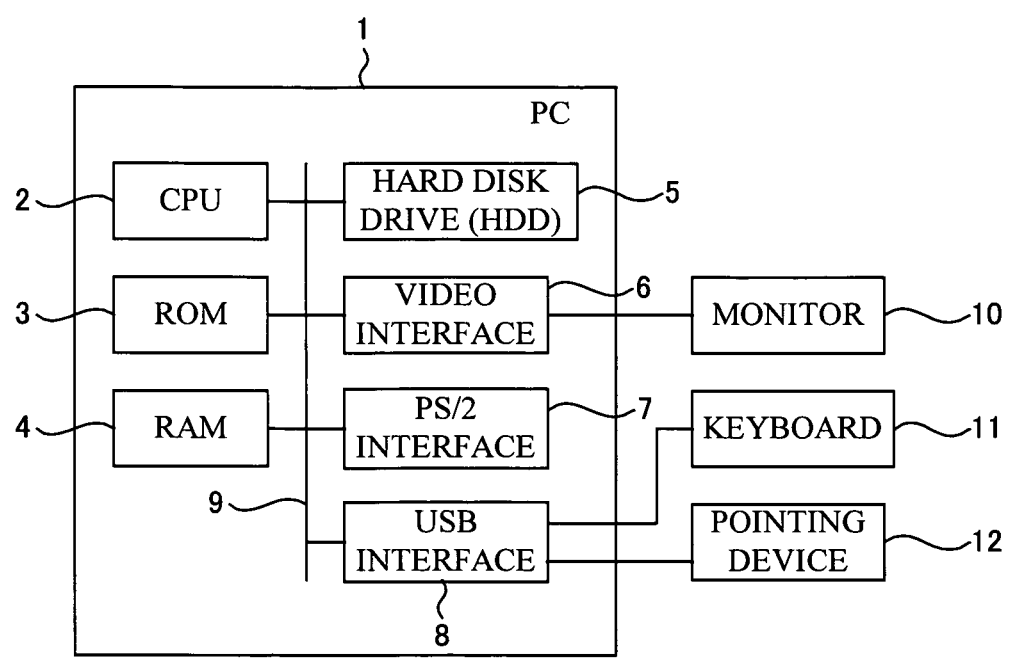
FIG. 1 is a diagram showing the schematic configuration of an information processing apparatus to which an input apparatus according to an embodiment of the present invention is connected.

FIG. 1 is a diagram showing the schematic configuration of an information processing apparatus to which an input apparatus according to an embodiment of the present invent is connected.

As shown in FIG. 1, a PC 1 as the information processing apparatus includes: a CPU 2 that controls the entire PC 1; a ROM 3 that has control programs; a RAM 4 that functions as a working area; a hard disk drive (HDD) 5 that has various information and programs, and an OS (Operating System); a video interface 6 to which a monitor 10 is connected; a PS/2 interface 7 and a USB (Universal Serial Bus) interface 8 to which a keyboard 11 and a pointing device 12 are connected. The CPU 2 is connected to the ROM 3, the RAM 4, the HDD 5, the video interface 6, the PS/2 interface 7 and a USB interface 8 via a system bus 9.

Figure 2A:
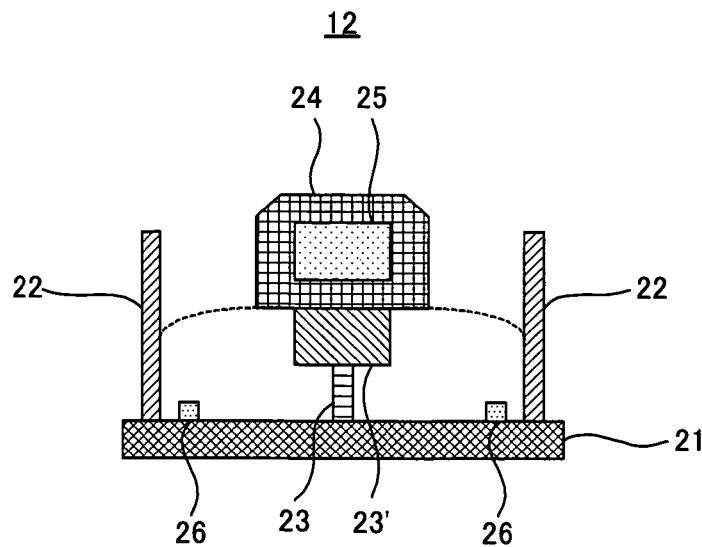
FIG. 2A is a cross-section diagram showing the configuration of a pointing device 12.
Figure 2B:
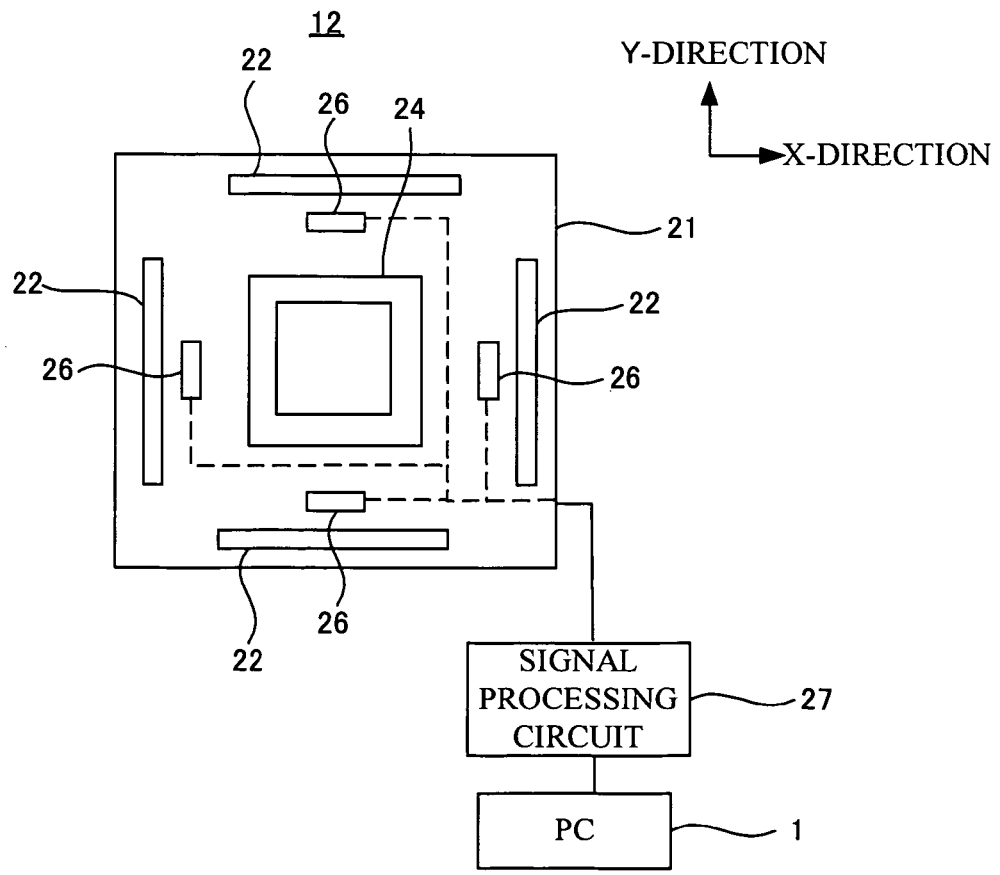
FIG. 2B is a diagram showing the schematic configuration of the pointing device 12 as viewed from above.

FIG. 2A is a cross-section diagram showing the configuration of a pointing device 12, and FIG. 2B is a diagram showing the schematic configuration of the pointing device 12 as viewed from above.

As shown in FIGS. 2A and 2B, the pointing device 12 includes a printed board 21, four magnetic bodies 22 (magnetic members), planar springs 23 and 23' (restoration portions), an operation element 24 (operation portion), a magnet 25, four detection elements 26 (detection portions), and a signal processing circuit 27 (output portion). The planar spring 23 is provided at the center of the printed board 21 in a vertical direction. In addition, the planar spring 23' is provided on the planar spring 23 such that the planar spring 23' is horizontally twisted 90 degrees from the planar spring 23. The operation element 24 is fixed on the planar spring 23'. The operation element 24 can incline toward an X-direction and a Y-direction of a horizontal plane by elastic forces of the planar springs 23 and 23'. The magnet 25 is attached to the operation element 24 in a state where it is detachable from the operation element 24. Thereby, when a user brings the operation element 24 close to any one of the magnetic bodies 22, the operation element 24 is attracted to the corresponding magnetic body 22 by an attractive force of the magnet 25.

The four magnetic bodies 22 are arranged on the printed board 21 so as to enclose the operation element 24 at maximum displacement positions of the X-direction and the Y-direction of the operation element 24. The maximum displacement position indicates a position where the operation element 24 can be maximally away from the origin (i.e., the center of the printed board 21) in the X-direction or the Y-direction.

Each of the four detection elements 26 is composed of a magnetoelectric conversion element that converts a change in a magnetic field from magnet 25 when the operation element 24 is inclined, into an electric signal. The four detection elements 26 are arranged on the printed board 21 so as to enclose the operation element 24. Each of the four detection elements 26 is connected to the signal processing circuit 27, and outputs the electric signal generated by the operation of the operation element 24 to the signal processing circuit 27. The signal processing circuit 27 detects an inclined direction and an inclined angle of the operation element 24 from the input electric signals, converts the inclined direction and the inclined angle into digital data for PC, and outputs the digital data to the PC 1.

Figure 3:
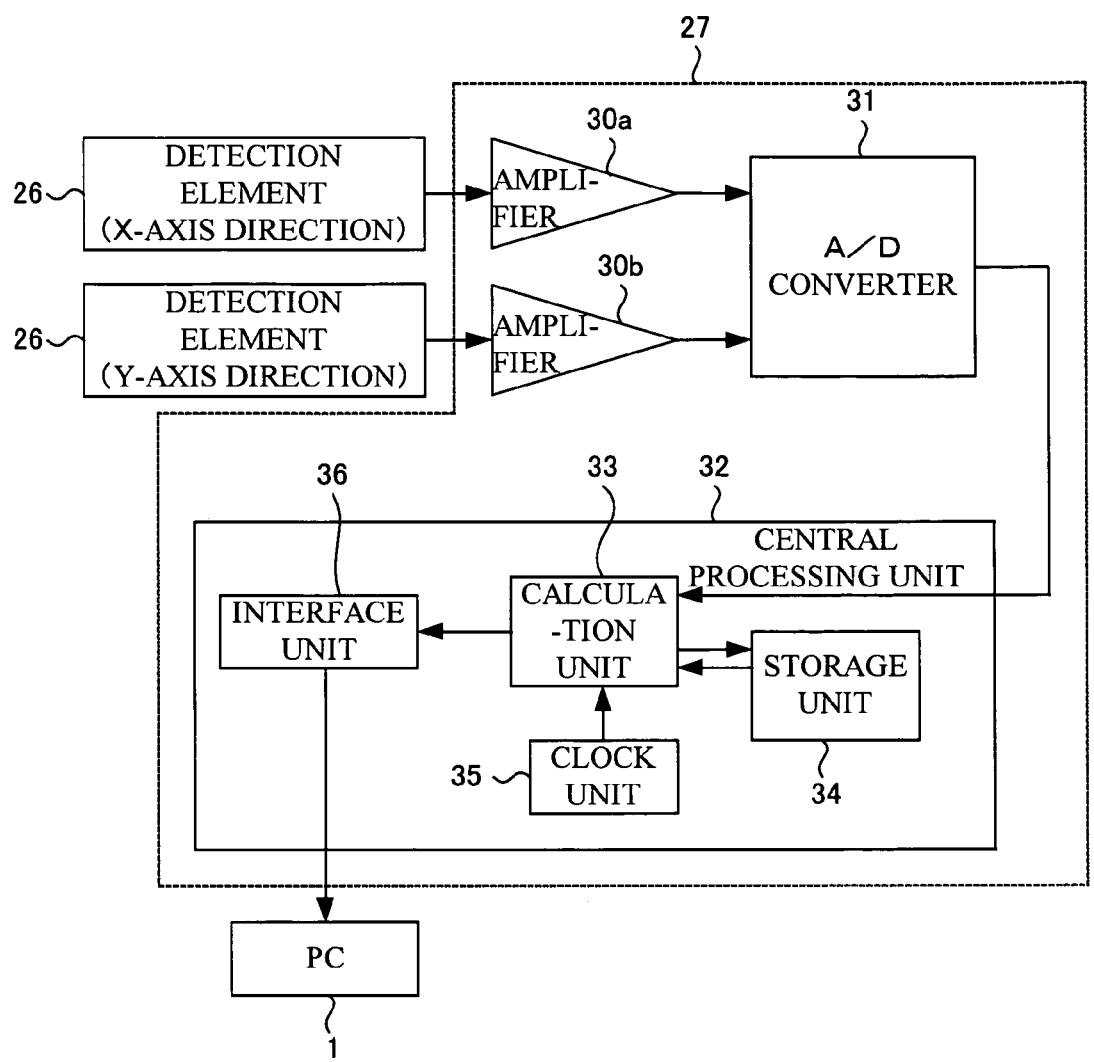
FIG. 3 is a block diagram showing the configuration of a signal processing circuit 27.

FIG. 3 is a block diagram showing the configuration of the signal processing circuit 27.

As shown in FIG. 3, the signal processing circuit 27 includes two amplifiers 30a and 30b, an A/D (Analog/Digital) converter 31, and a central processing unit (CPU) 32. The central processing unit (CPU) 32 includes a calculation unit 33, a storage unit 34, a clock unit 35, and an interface unit 36. The output voltages of two detection elements 26 arranged in parallel with an X-axis are differentially amplified with the amplifier 30a. The output voltages of two detection elements 26 arranged in parallel with a Y-axis are differentially amplified with the amplifier 30b. The amplified voltages are A/D-converted with the A/D converter 31, and the A/D-converted voltages are output to the CPU 32 as digital data. The calculation unit 33 in the CPU 32 calculates the inclined direction and the inclined angle which the digital data output from the A/D converter 31 indicates in synchronization with a clock from the clock unit 35, based on table data indicating the inclined direction and the inclined angle of the operation element 24 previously stored into the storage unit 34. In addition, the calculation unit 33 outputs the result of the calculation to the interface unit 36. The interface unit 36 converts the result of the calculation from the calculation unit 33 into digital data which the computer can recognize, and outputs the digital data to the PC 1. The PC 1 moves the pointer or the cursor as an instruction sign based on the digital data.

Figure 4A:
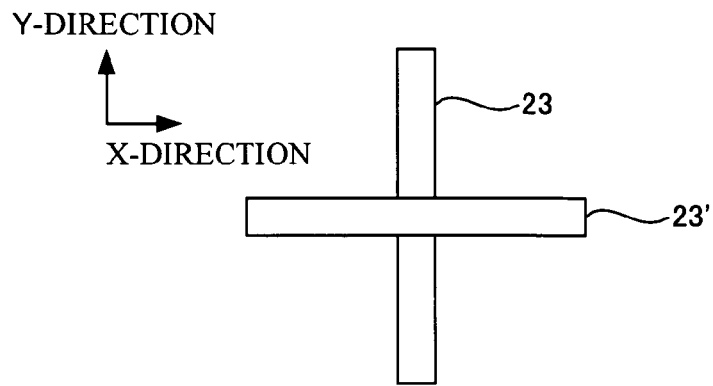
FIG. 4A is a view showing planar springs 23 and 23' as viewed from above.
Figure 4B:
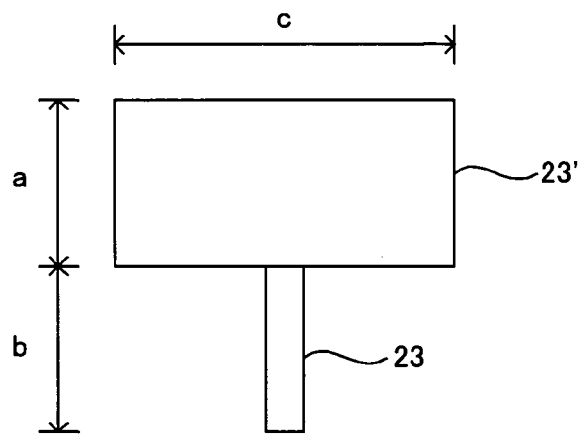
FIG. 4B is a side view showing the planar springs 23 and 23' as viewed from front faces thereof.
Figure 4C:
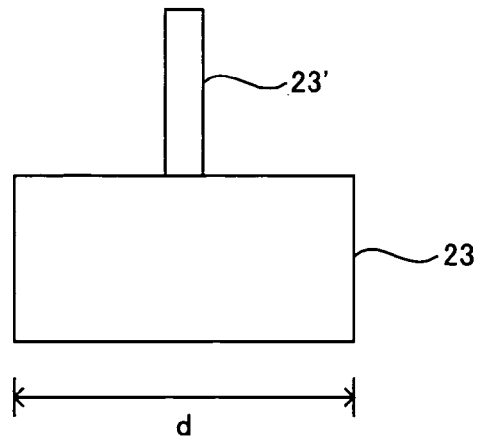
FIG. 4C is a side view showing the planar springs 23 and 23' as viewed from a right side thereof.

FIG. 4A is a view showing planar springs 23 and 23' as viewed from above, FIG. 4B is a side view showing the planar springs 23 and 23' as viewed from front faces thereof, and FIG. 4C is a side view showing the planar springs 23 and 23' as viewed from a right side thereof.

The planar springs 23 and 23' are formed integrally with each other by bonding or welding two planar springs together. The planar springs 23 and 23' are formed such that right and left sides of a single planar spring are cut, and an upper part of the single planar spring is twisted 90 degrees from a lower part thereof. It should be noted that a twisted part between the upper part of the single planar spring and the lower part thereof is called a twisted position.

When the conditions are "a=b" and "c>d" in FIGS. 4B and 4C, the user has an operational feeling of the Y-direction heavier than that of the X-direction. In this case, the restoring force of the Y-direction to the origin is stronger than that of the X-direction. When the conditions are "c=d" and "a>b", the user has an operational feeling of the X-direction heavier than that of the Y-direction. In this case, the restoring force of the X-direction to the origin is stronger than that of the Y-direction. Thus, an any operational feeling can be made by adjusting the sizes of the planar springs 23 and 23' (concretely, each length of "a", "b", "c", and "d").

Figure 5A:
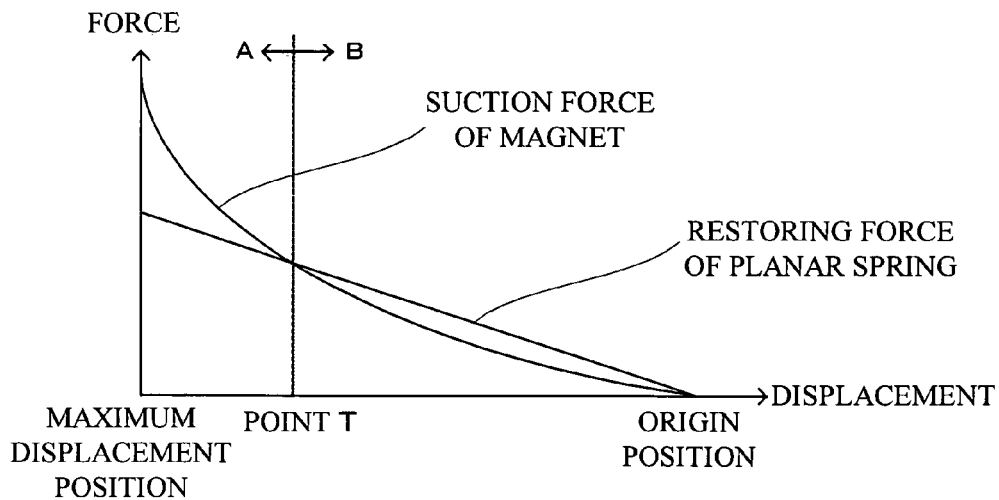
FIG. 5A is a diagram showing a relationship between attractive force of a magnet 25 and restoring forces of the planar springs 23 and 23'.
Figure 5B:
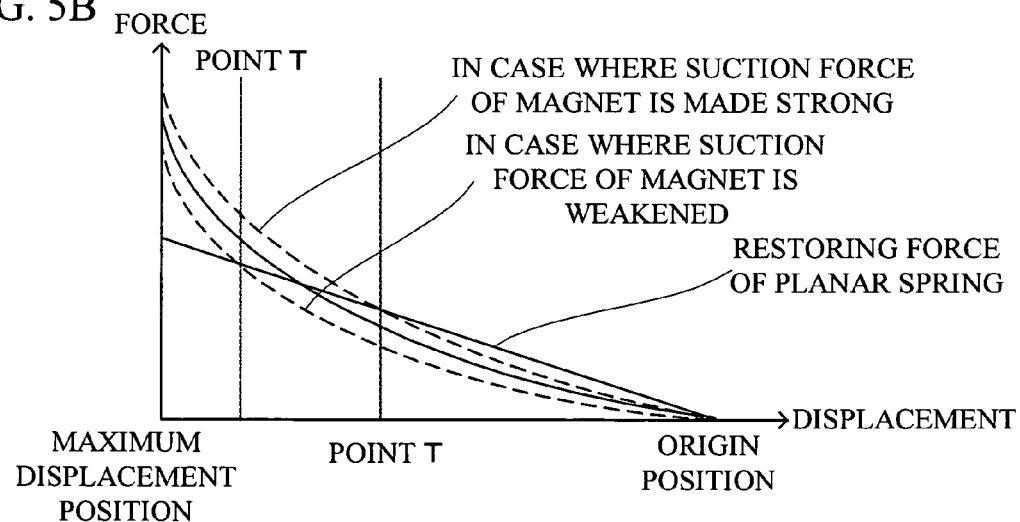
FIG. 5B is a diagram showing a relationship between the attractive force of the magnet 25 and the restoring forces of the planar springs 23 and 23' when the attractive force of the magnet 25 is changed.
Figure 5C:
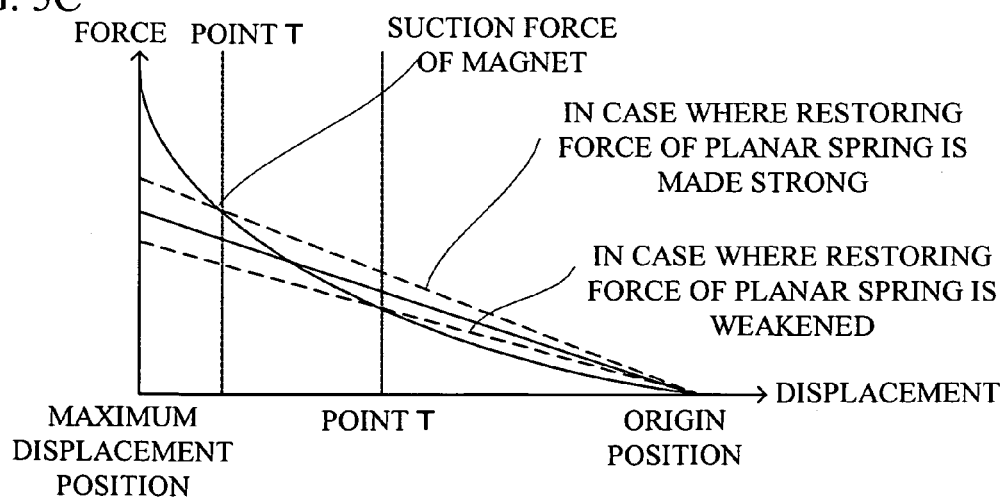
FIG. 5C is a diagram showing a relationship between the attractive force of the magnet 25 and the restoring forces of the planar springs 23 and 23' when the restoring forces of the planar springs 23 and 23' are changed.

FIG. 5A is a diagram showing a relationship between an attractive force of a magnet 25 and restoring forces of the planar springs 23 and 23', FIG. 5B is a diagram showing a relationship between the attractive force of the magnet 25 and the restoring forces of the planar springs 23 and 23' when the attractive force of the magnet 25 is changed, and FIG. 5C is a diagram showing a relationship between the attractive force of the magnet 25 and the restoring forces of the planar springs 23 and 23' when the restoring forces of the planar springs 23 and 23' are changed.

The attractive force of the magnet 25 and the restoring forces of the planar springs 23 and 23' are applied to the operation element 24. In FIG. 5A, when the user applies to the operation element 24 a force that goes beyond a point T (i.e., a point where the attractive force of the magnet 25 is the same as the restoring forces of the planar springs 23 and 23' in an opposite direction) in an "A" side direction, the attractive force of the magnet 25 to the magnetic body 22 is larger than the restoring forces of the planar springs 23 and 23' in the opposite direction, and hence the operation element 24 inclines or is attracted at the maximum displacement position. On the other hand, when the user applies to the operation element 24 a force that goes beyond a point T in a "B" side direction, the restoring forces of the planar springs 23 and 23' are larger than the attractive force of the magnet 25 in the opposite direction, and hence the operation element 24 returns to the origin position by the restoring forces of the planar springs 23 and 23'.

As shown in FIG. 5B, when the attractive force of the magnet 25 is made strong, the point T moves to an origin position side. On the other hand, when the attractive force of the magnet 25 is weakened, the point T moves to a maximum displacement position side. The attractive force of the magnet 25 is changed by changing the size or the material of the magnet 25.

As shown in FIG. 5C, when the restoring forces of the planar springs 23 and 23' are made strong, the point T moves to the maximum displacement position side. On the other hand, when the restoring forces of the planar springs 23 and 23' are weakened, the point T moves to the origin position side. The restoring forces of the planar springs 23 and 23' are changed by changing the sizes or the materials of the planar springs 23 and 23'.

Thus, the user can freely decide a range where the operation element 24 is attracted to the maximum displacement position or a range where the operation element 24 is restored to the origin position, by combining the attractive force of the magnet 25 and the restoring forces of the planar springs 23 and 23'. Also, the user can make the any operation feeling of the operation element 24 by combining the attractive force of the magnet 25 and the restoring forces of the planar springs 23 and 23'.

Figure 6A:
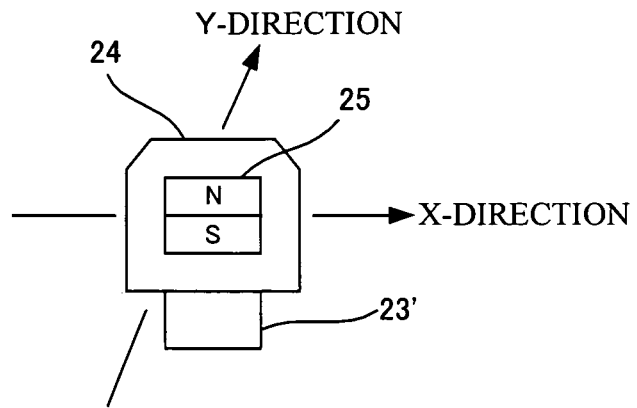
FIGS. 6A to 6C are diagrams showing the arrangement of the north pole and the south pole of the magnet 25.
Figure 6B:
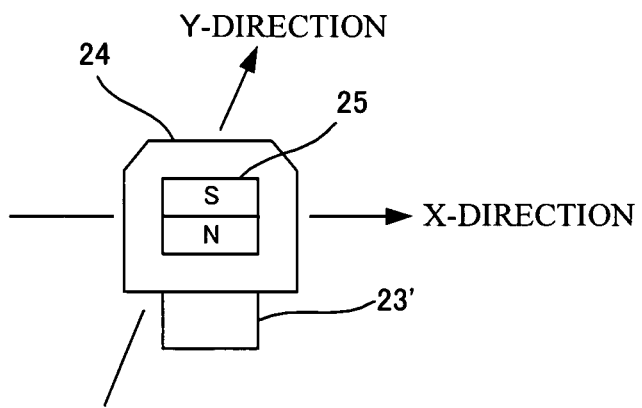
Figure 6C:
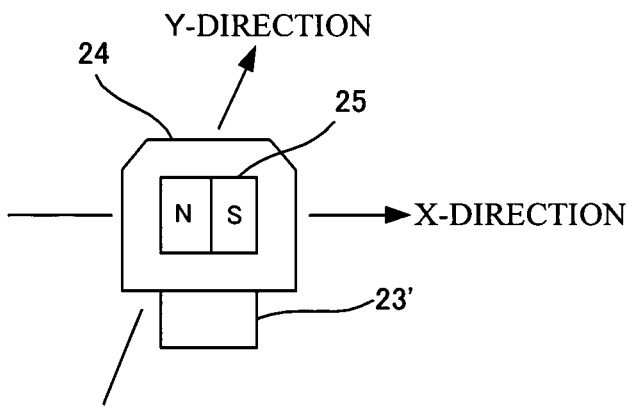

FIGS. 6A to 6C are diagrams showing the arrangement of the north pole and the south pole of the magnet 25.

In the present embodiment, the north pole and the south pole of the magnet 25 are arranged as shown in FIGS. 6A and 6B. The magnet 25 has a cubic shape. In this case, the attractive forces of the X-direction and the Y-direction of the magnet 25 are equal to each other. On the other hand, the north pole and the south pole of the magnet 25 may be arranged as shown in FIG. 6C. In this case, the attractive force of the X-direction can be made stronger than that of the Y-direction. The attractive force for each direction can be changed by changing the size of the magnet 25 of the X-direction or the Y-direction.

Figure 7A:
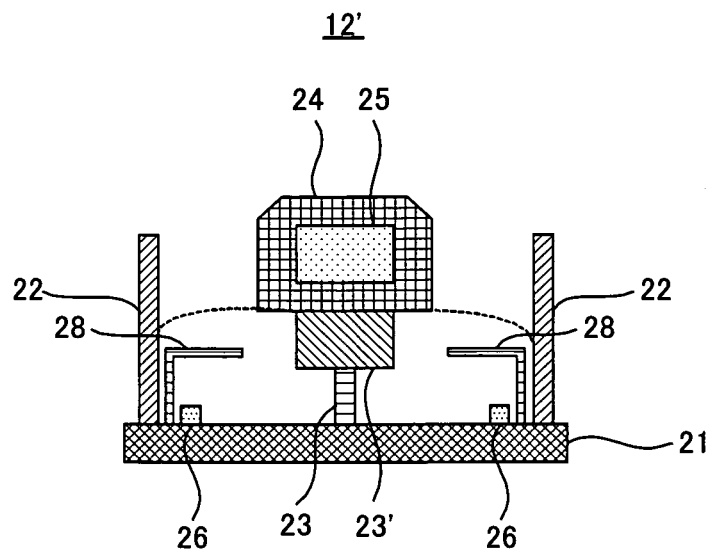
FIG. 7A is a cross-section diagram showing a variation of the configuration of the pointing device.
Figure 7B:
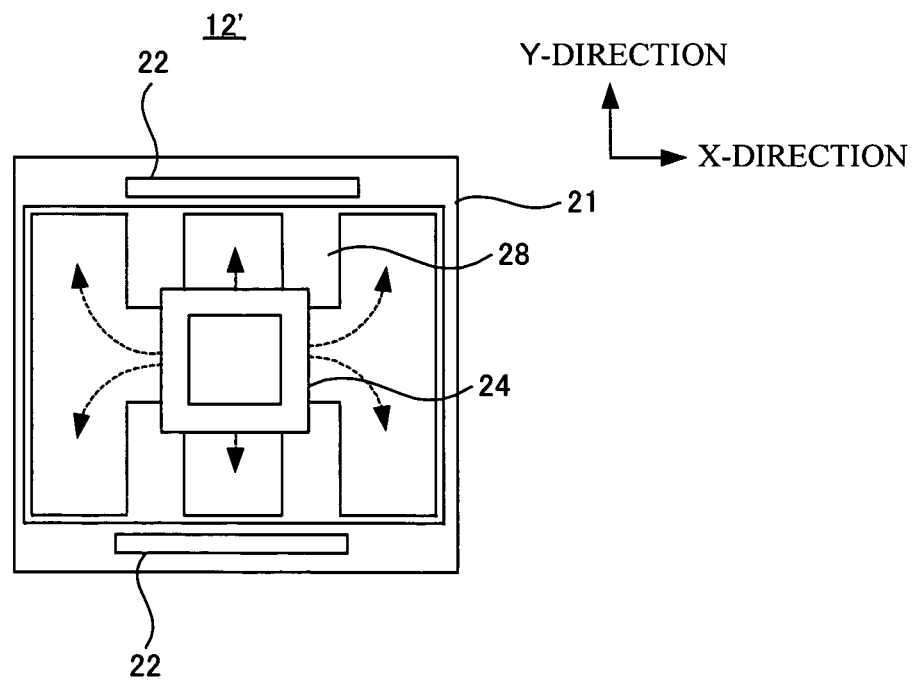
FIG. 7B is a diagram showing the schematic configuration of the pointing device as viewed from above.

FIG. 7A is a cross-section diagram showing a variation of the configuration of the pointing device, and FIG. 7B is a diagram showing the schematic configuration of the pointing device as viewed from above.

In the pointing device 12' of FIG. 7A, a restriction member 28 (a restriction portion) is added to the pointing device 12' of FIG. 2A. As shown in FIG. 7B, the restriction member 28 restricts the movement of the operation element 24 to a double-H shape. Thereby, it is possible to provide the user with an operation feeling like a manual transmission of a vehicle.

Figure 8:
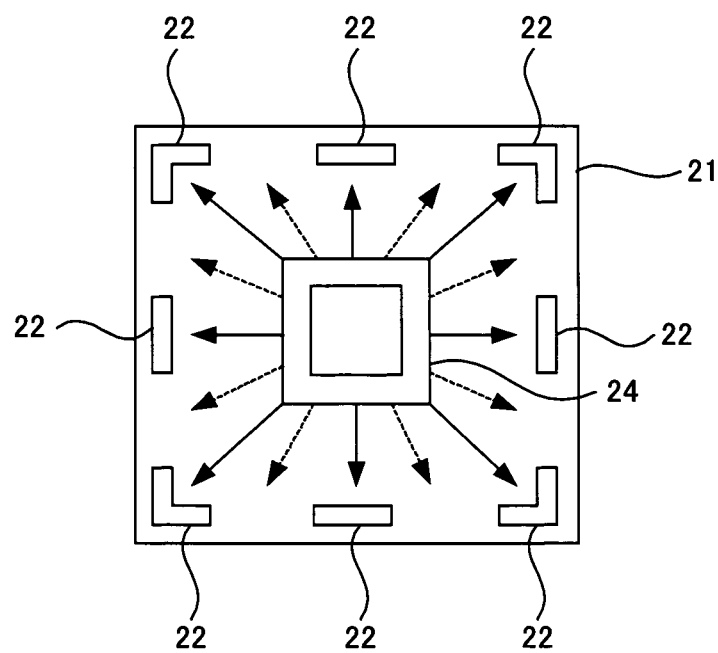
FIG. 8 is a diagram showing a variation of the arrangement of magnetic bodies.

FIG. 8 is a diagram showing a variation of the arrangement of the magnetic bodies.

As shown in FIG. 8, eight magnetic bodies 22 are arranged at eight directions where the operation element 24 can incline. In this case, when the user inclines the operation element 24 in a single arrow direction of solid lines, and the operation element 24 goes beyond a given position (i.e., the point where the attractive force of the magnet 25 is the same as the restoring forces of the planar springs 23 and 23' in the opposite direction), the operation element 24 is attracted to one of the eight magnetic bodies 22 in the corresponding direction. On the other hand, when the user inclines the operation element 24 in a single arrow direction of short dashed lines, the operation element 24 returns to the origin (i.e., the center of the printed board) even if the operation element 24 reaches the maximum displacement position.

Thus, the magnetic bodies 22 may be arranged at the positions where the user wants to lock the operation element 24.

As described in detail hereinabove, according to the present embodiment, the attractive force of the magnet 25 exceeds the restoring forces of the planar springs 23 and 23' at the maximum displacement position, and hence the operation element 24 is fixed to the maximum displacement position. At the position where the attractive force of the magnet 25 does not exceed the restoring forces of the planar springs 23 and 23', the operation element 24 is restored to the origin (i.e., reference position) by the planar springs 23 and 23'. Therefore, it is possible to fix the operation element 24 at the maximum displacement position, and return the operation element 24 to the origin.

When the user moves the pointer or the cursor (i.e., instruction sign) to a single direction, the user can move the pointer or the cursor without continuing the operation to a target position, by applying a force to the operation element 24 along the single direction. In addition, the user applies a force exceeding the restoring forces to the operation element 24, so that the sense of the force can be presented to the user by the attractive force of the magnet, and it is possible to make the user recognize the strong operation.

When the elastic member supporting the operation element 24 is composed of a piece of planar spring having a plane in parallel with a perpendicular direction, the upper part and the lower part of the single planar spring are mutually twisted 90 degrees at the any position of the plane, and hence it is possible to provide the user with an operation feeling corresponding to the position where the single planar spring is twisted. Also, when the position where the single planar spring is twisted is the center of the plane, the operation element 24 can evenly incline forward, backward, rightward and leftward. In addition, when the sizes of the upper part and the lower part of the single planar spring are different from each other, it is possible to provide the user with the operation feeling depending on the different sizes of the upper part and the lower part of the single planar spring.

When the elastic member supporting the operation element 24 is composed of the planar springs 23 and 23' each having a plane in parallel with the perpendicular direction, the planar spring 23 is joined to the planar spring 23' so that the planar spring 23 is twisted 90 degrees from the planar spring 23'. Therefore, it is possible to provide the user with the operation feeling depending on each of the sizes of the planar springs 23 and 23' and a joint position. When the sizes of the planar springs 23 and 23' are the same as each other, the operation element 24 can evenly incline forward, backward, rightward and leftward.

Also, the magnet included in the operation element 24 can exchanged for other magnet having different magnetism, it is possible to adjust the operation feeling of the operation element 24.

Figure 9:
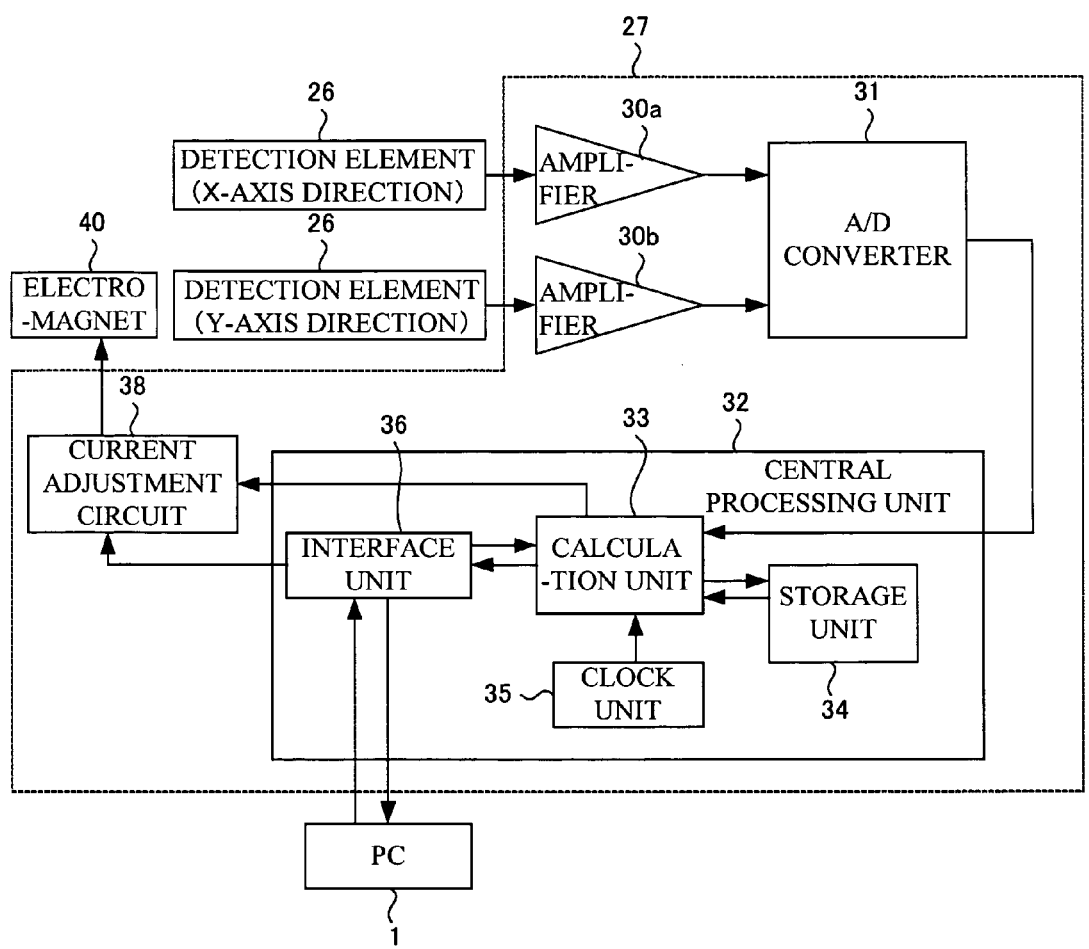
FIG. 9 is a block diagram showing a variation of the configuration of the signal processing circuit 27.
Figure 10:
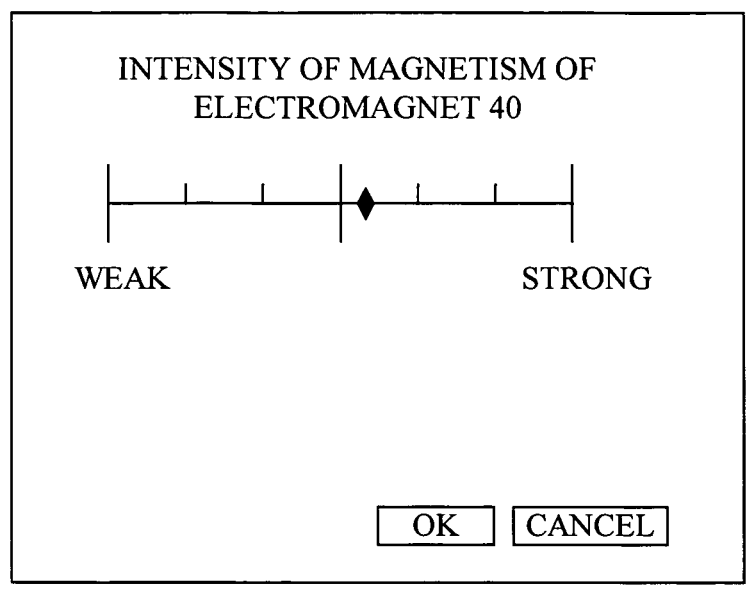
FIG. 10 is a diagram showing an example of a driver that sets the intensity of magnetism of an electromagnet 40 in an operation element 24.

Although in the present embodiment, the permanent magnet is used as the magnet 25, an electromagnet 40 may be used on behalf of the permanent magnet. FIG. 9 shows the configuration of the signal processing circuit 27 in this case. In the signal processing circuit 27 of FIG. 9, a current adjustment circuit 38 (a current adjustment portion) composed of a plurality of resistances or the like is added to the signal processing circuit 27 in FIG. 3. Also, a driver that sets the intensity of magnetism of the electromagnet 40 in the operation element 24 is previously installed into the HDD 5 of the PC 1. FIG. 10 is a diagram showing an example of the driver that sets the intensity of magnetism of the electromagnet 40 in the operation element 24.

When the user sets the intensity of magnetism of the electromagnet 40 with the driver, a setting value is transmitted to the calculation unit 33 (an acquisition portion) via the interface unit 36. A current is supplied from the PC 1 to the current adjustment circuit 38 via the interface unit 36. The calculation unit 33 adjusts values of the resistances included in the current adjustment circuit 38 depending on the received setting value, and controls a value of the current supplied from the current adjustment circuit 38 to the electromagnet 40. Thereby, the intensity of magnetism of the electromagnet 40 in the operation element 24 is controlled. Accordingly, it is possible to adjust the operation feeling of the operation element 24 depending on the setting value of magnetism of the electromagnet 40 set by the PC 1.

It should be noted that the present invention is not limited to the above-described embodiments, and various modifications may be made to them without departing from the scope of the invention.

The Present application is based on Japanese Patent Application No. 2008-160373 filed Jun. 19, 2008, the entire disclosure of which is hereby incorporated by reference.

What is claimed is:

1. An input apparatus that moves an image on a display device, the display device being connected to an information processing apparatus, comprising:

a planar base;

an operation portion that is spaced from the base, includes a magnet, is movable between a first restoration position along an axis perpendicular to the planar base, and a second position inclined relative to the axis that is a maximum displacement position of the operation portion, and operates the movement of the image;

a restoration portion connecting the planar base and the operation portion and having a force biasing the operation portion into the first restoration position, wherein the restoration portion suspends and supports the operation portion relative to the base, wherein the restoration portion includes two integrally connected planar spring portions that are, in the first restoration position, perpendicular to the planar base, and in the second position, at least one of the two connected planar spring portions is not perpendicular to the base, and wherein the two connected planar spring portions are oriented perpendicularly relative to each other and intersect the axis;

at least one magnetic member arranged near the second position of the operation portion, a detection portion that detects an inclination of the operation portion relative to the axis; and an output portion that outputs the inclination detected by the detection portion to the information processing apparatus.

2. The input apparatus as claimed in claim 1, wherein a center line of each of the two planar springs is coaxial with the axis.

3. The input apparatus as claimed in claim 1, wherein sizes of each of the two planar springs are different from each other.

4. The input apparatus as claimed in claim 1, wherein sizes of the two planar springs are the same as each other.

5. The input apparatus as claimed in claim 1, wherein the operation portion magnet is replaced by another magnet having different magnetism.

6. The input apparatus as claimed in claim 1, further comprising a restriction portion that restricts the movement of the operation portion to a double-H shape.

7. The input apparatus as claimed in claim 1, wherein the magnet is an electromagnet, and the input apparatus further includes an acquisition portion that acquires a setting value of magnetism of the electromagnet from the information processing apparatus, and a current adjustment portion that adjusts a value of a current supplied from the information processing apparatus to the electromagnet based on the setting value.

8. The input apparatus as claimed in claim 1, wherein the at least one magnetic member is four magnetic members equally spaced around the operation portion.

9. The input apparatus as claimed in claim 1, wherein the at least one magnetic member is eight magnetic members equally spaced around the operation portion.

10. The input apparatus as recited in claim 1, wherein, when the operation portion is inclined and an attractive force between the magnet in the operation portion and the at least one magnetic member exceeds the restoring force of the restoration portion, the operation portion is maintained in the second position, and wherein, when the operation portion is inclined and the attractive force between the magnet in the operation portion and the at least one magnetic member is less than the restoring force, the operation member is biased to return to the first restoration position.

* * * * *

UNITED STATES PATENT AND TRADEMARK OFFICE
CERTIFICATE OF CORRECTION

| | |
|---|---|
| PATENT NO. | : 8,508,477 B2 |
| APPLICATION NO. | : 12/457641 |
| DATED | : August 13, 2013 |
| INVENTOR(S) | : Takashi Yuba |

It is certified that error appears in the above-identified patent and that said Letters Patent is hereby corrected as shown below:

On the Title Page, Item -75- Col. 1 (Inventor), Line 1, Delete "Shiagawa (JP)" and insert -- Shinagawa (JP) --, therefor.

Signed and Sealed this
Tenth Day of December, 2013

Margaret A. Focarino
*Commissioner for Patents of the United States Patent and Trademark Office*